Figure 1:
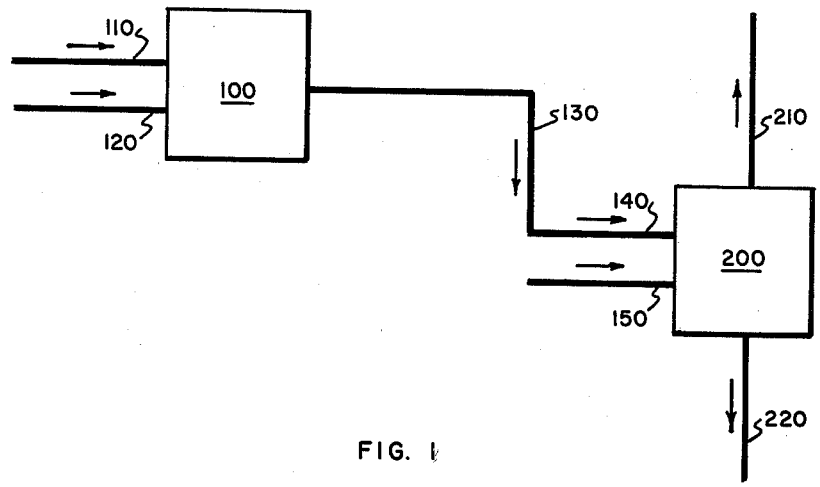

May 4, 1965 W. T. DAVIS 3,181,934
PROCESS FOR RECOVERY OF ELEMENTAL BROMINE
FROM AN AQUEOUS BROMINE SOLUTION
Original Filed Feb. 28, 1962 2 Sheets-Sheet 1

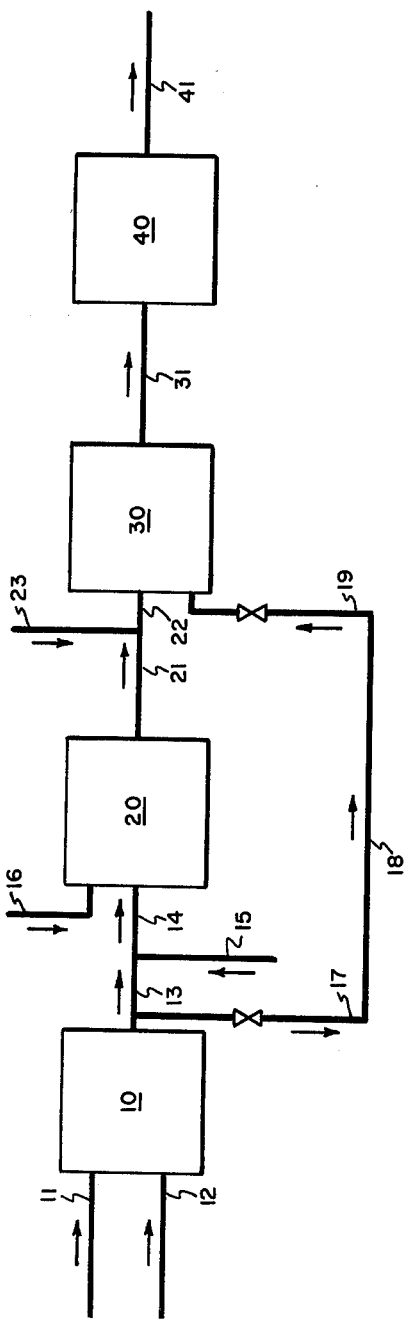

United States Patent Office 3,181,934
Patented May 4, 1965

3,181,934
PROCESS FOR RECOVERY OF ELEMENTAL BROMINE FROM AN AQUEOUS BROMINE SOLUTION
Wayne T. Davis, Baton Rouge, La., assignor to Ethyl Corporation, New York, N.Y., a corporation of Virginia
Continuation of application Ser. No. 176,380, Feb. 28, 1962. This application Feb. 17, 1964, Ser. No. 345,406
3 Claims. (Cl. 23—218)

This application is a continuation of application Serial Number 176,380, filed Feb. 28, 1962, now abandoned.

This invention relates to a method for the recovery of halogens from solutions containing halides. In particular, it relates to a method of extracting and recovering elemental bromine from sea water and other natural, or even artificially produced salt brines.

A well known process for the production of elemental chlorine involves the oxidation of hydrogen chloride with oxygen (or air) in the presence of a variable state oxidation catalyst. This process, known as the "Deacon Process," is of ancient vintage but has not met with wide commercial acceptance. Thus, the process is subject to many shortcomings. An important reason militating against commercial acceptance of this process involves the necessity of separating the desirable chlorine product formed in the reaction from the by-product gases and non-reactables. This separation is extremely burdensome. Thus, for example, when hydrogen chloride and air are contacted together under suitable conditions and in the presence of a suitable catalyst some elemental chlorine is formed; but there is also present a large quantity of inert gases and even large quantities of unreacted hydrogen chloride for the conversion levels of the hydrogen chloride to chlorine in such processes leave something to be desired. So, before the chlorine can be used in a commercial process, it is necessary to separate the chlorine from these large quantities of by-product and unreacted gases. Such separation is so significantly expensive as to be prohibitive to the wide use of the Deacon Process.

For example, a method of effecting this separation is to feed the effluent from the Deacon Process into a packed column or absorber wherein hydrogen chloride is absorbed in water to form a hydrochloric acid solution. The nitrogen and chlorine are evolved from the top of the absorber while the concentrated hydrochloric acid solution is further treated to reform anhydrous hydrogen chloride, which hydrogen chloride is fed back to the Deacon Process. This operation is inherently expensive to say nothing of the requirement of separating chlorine from the other unreacted and inert gases. To separate chlorine from these gases the mixture of gases is generally refrigerated under pressure to liquefy the chlorine. The chlorine is then suitable for use, as for feeding to a commercial chlorination process.

Because of this complex separation problem among other reasons, numerous variations have been made in the original Deacon Process in an attempt to avoid this costly separation. Thus, many of the various modifications of the old Deacon Process call for the addition of hydrocarbon compounds with the hydrogen chloride and oxygen-containing gas fed into the reaction. Pursuant to these types of reactions at least a portion of the hydrogen chloride is oxidized to form chlorine, which chlorine reacts with the hydrocarbons to form chlorination products directly. Even these oxychlorination processes, as well as the original Deacon Process, however, have left much to be desired. In fact, despite the availability of a large variety of all types of oxychlorination processes the over production of hydrogen chloride by various commercial substitution chlorination processes continues to be a problem of major proportions confronting the present chemical industry. Hydrogen chloride continues to be a drag on the market and processes for hydrogen chloride utilization have failed dismally to provide for hydrogen chloride utilization. So, despite the wide availability of hydrogen chloride, if only the chlorine values contained within the hydrogen chloride could be utilized, the main source of chlorine continues to be via the electrolysis of sodium chloride.

Now, a commercial process very dependent upon chlorine for its success is that involving manufacture of elemental bromine from sea water or other brines. In general, these processes involve the steps of acidifying the brine by addition of an acid. The acidified solution is then treated with elemental chlorine, under which conditions the bromide salt contained in the brine is oxidized to liberate elemental bromine which remains in the solution because of its dilute concentration. The solution is then blown with large volumes of air to desorb or entrain the bromine. The air is then contacted with sulfur dioxide gas, which reacts with the elemental bromine. Further reaction with water in an absorption tower forms a hydrogen bromide sulfuric acid solution. This solution is again contacted with elemental chlorine to again form elemental bromine which can be recovered by steam distillation from the more concentrated bromine solution. Among certain limitations prevalent in this process is that of having to provide large amounts of chlorine for oxidation of the bromide salts.

The primary objective of the present invention is to provide a process by which the disadvantages of the above processes are largely overcome, but at the same time to retain the advantages offered by each. Thus, the principal object of this invention is to provide a new method of utilizing the Deacon Process for recovery of elemental bromine from sea water and other natural or artificial brines. Another object is to provide a less expensive process for the production of elemental bromine from sea water. Yet another object is to eliminate the need of large quantities of compressed air for blowing out bromine from sea water.

These and other objects are achieved in accordance with the present invention comprising reacting or contacting together within a first zone, hydrogen chloride and an oxygen-containing gas in the presence of a variable state oxidation catalyst so that at least a portion of the hydrogen chloride is oxidized to elemental chlorine. The effluent from this oxidative hydrochlorination reaction, consisting essentially of chlorine, water vapor, unreacted hydrogen chloride and other inert gases is contacted in a second zone with an aqueous solution which contains an oxidizable bromide providing bromine in concentrations ranging from about at least 1000 parts, per million parts of solution. In the most preferred embodiments the bromide solution contains an oxidizable bromide, providing bromine in concentrations ranging from about 1000 parts, per million parts of solution, to about 1 or 2 weight percent bromine. Solutions containing a bromide providing bromine in concentrations of at least about 2500 parts, per million parts of solution, are particularly suitable for the practice of this invention.

Pursuant to the most preferred embodiments the effluent from the oxidative hydrochlorination reaction can be contacted with the brine solution and then fed into a zone, such as a blowing-out tower, so that the elemental bromine which is liberated can be heated or otherwise removed such as by steaming out, then the effluent from the blowing-out tower condensed, then stratified to form a separate water and bromine layer from which the bromine can then be drawn off and recovered.

Pursuant to the present invention it has been discovered that various benefits are derived by the foregoing combination of steps, involving in effect a unique combination of an oxidation of hydrogen chloride step as a portion of the overall combination for the treatment of brine to produce elemental bromine. Thus, effluent from an oxidation of hydrogen chloride process is fed into a brine solution to simultaneously effect its acidification and also to provide the necessary chlorine for oxidation of the bromide solution to liberate elemental bromine. Thus, the oxidation of the hydrogen chloride step provides a particularly unique portion of the overall combination for extraction and concentration of the elemental bromine. A major and distinct advantage in the combination of steps is that substantially all of the effluent of the oxidation of hydrogen chloride reaction is used for a useful purpose thus eliminating the need for recycle as in a normal oxidation of hydrogen chloride process.

Pursuant to the most preferred embodiments therefore it is seen that there is provided a quite simple and most unique combination of steps for the production of bromine from solutions providing about one thousand parts of elemental bromine, per million parts of solution, and upwards. But, bromine solutions of a more dilute nature, however, can also be conveniently treated. Thus, a series of bromine concentrating steps can also be employed as a portion of an overall combination. The effluent from the oxidative hydrochlorination reaction is contacted with the brine in a blowing-out tower or zone to which can be added air or other gas for desorption of the bromine from the liquid. The air, now containing elemental bromine is then contacted with a reducing agent such as sulfur dioxide and with water, to form a hydrogen bromide in sulfuric acid solution. This step in effect concentrates the elemental bromine, in the form of hydrogen bromide. The hydrogen bromide solution is then contacted with an oxidizing agent and is heated to liberate and to effect separation of elemental bromine from the solution.

The present invention therefore contemplates also the combination including one or more of a series of concentration steps whereby the bromine of the original brine is formed into a more concentrated solution prior to final oxidation of the bromide and recovery of the liberated bromine from the solution by heating. In a preferred embodiment the present invention contemplates also the combination comprising reacting or contacting together, within a first zone, hydrogen chloride and an oxygen-containing gas in the presence of a variable state oxidation catalyst so that at least a portion of the hydrogen chloride is oxidized to elemental chlorine. The effluent from this oxidative hydrochlorination reaction, consisting essentially of chlorine, water vapor, unreacted hydrogen chloride, and other inert gases is contacted with an aqueous solution which contains a bromide salt, and fed into a second zone. In this contacting step free bromine is formed from the bromide salt of the solution, and the free bromine is separated from the aqueous phase and contained within the gas phase. Where additional amounts of a gas are needed to effectively and efficiently remove essentially all traces of the bromine from the aqueous phase, additional quantities of gas, such as air, can be conveniently blown through the liquid within the second zone. The moist air, or gas, or mixture of gases containing elemental bromine, is next contacted with sulfur dioxide and water in a third zone. The ensuing reaction forms a hydrogen bromide in sulfuric-acid solution. The hydrogen bromide, in these series of steps is far more concentrated as regards bromine content, than in the original aqueous solution containing the bromide salt.

The hydrogen bromide solution is then contacted with chlorine to oxidize the hydrogen bromide to elemental bromine. Then, the elemental bromine is liberated from the aqueous phase and recovered, preferably by steam distillation.

A feature of this invention also provides for the oxidation of the hydrogen bromide of the aqueous solution by the use of an effluent from the oxidative reaction between hydrogen chloride and oxygen. Thus, in a preferred embodiment the effluent from an oxidation of hydrogen chloride reaction is also fed into the aqueous hydrogen bromide solution to oxidize the hydrogen bromide and to liberate elemental bromine. The bromine is then removed from the solution, preferably by steam distillation.

A highly preferred oxygen-containing gas is air because of its cheapness and availability.

Figure 2:
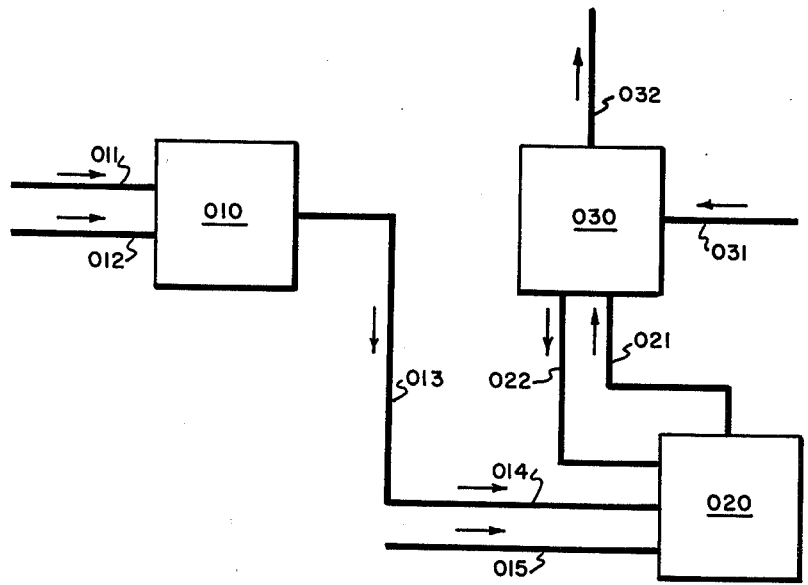

The invention will be better understood by reference to the accompanying schematic diagrams wherein FIGURE 1 shows the combination of an oxidative hydrogen chloride reaction to produce an effluent which is fed with brine and steam into a zone to produce elemental bromine;

FIGURE 2 shows a combination similar to the foregoing but wherein two staged zones are employed; and FIGURE 3 shows a preferred embodiment for producing elemental bromine wherein is included a series of concentration steps.

FIGURE 1 shows the feeding of air and gaseous hydrogen chloride through lines 110, 120 under hydrogen chloride oxidizing conditions into a reaction zone 100 wherein is present a variable state oxidation catalyst. The effluent evolved from zone 100 is fed via lines 130, 140 into zone 200 wherein is also added steam through line 150. In this zone 200 elemental bromine is liberated and is evolved from the top of the zone through line 210. The gaseous effluent from line 210 is condensed and stratified in a zone (not shown). Elemental bromine is drawn from this vessel and sent to storage, while the water is ditched or reused for steam. Waste water from which almost all of the bromine has been removed is withdrawn from the zone 200 via line 220 and ditched.

In FIGURE 2 air and gaseous hydrogen chloride are fed via lines 011, 012, respectively into zone 010 under hydrogen chloride oxidation conditions to produce an effluent which is removed from the zone and fed via lines 013, 014 into zone 020 which is one of two staged zones. Thus, zone 020 is staged with zone 030, these zones serving as steaming out zones. To the lower zone 020 is added, in addition to the hydrogen chloride oxidation effluent, steam via line 015. To the upper zone 030 is added brine via line 031. The upper zone 030 and lower zone 020 are connected via lines 021, 022 a gaseous effluent passing upwardly through line 021 and liquid descending via line 022. The effluent containing elemental bromine passes from zone 030 via line 032. This effluent is condensed, stratified and recovered in a zone (not shown).

In FIGURE 3 air and gaseous hydrogen chloride are fed through lines 11, 12, respectively, under hydrogen chloride oxidizing conditions into a reaction zone 10 wherein is present a chloride of a metal of a variable valence, such as copper chloride. From this zone 10 is evolved an effluent or products including chlorine and water and also unreacted hydrogen chloride and inert gases. This effluent is removed from the reaction zone 10 via lines 13, 14. This effluent is then contacted with a brine solution fed via line 15 and fed through lines 13, 14 into a blowing out zone 20. Within the blowing out zone 20 is fed, through line 16, air to desorb elemental bromine. The bromine laden air is passed through lines 21, 22 into contact with sulfur dioxide and water fed into lines 21, 22 via line 23. In this step the elemental bromine is formed into hydrogen bromide contained within a sulfuric acid solution. This solution is fed into another distinct zone 30 wherein it is contacted with chlorine and steam, generally simultaneously. The chlorine oxidizes the hydrogen bromide to again form elemental bromine. And steam is employed to distill out the elemental bromine which is liberated. The effluent from this zone 30 is passed through line 31 to zone 40 wherein it is condensed as in a water-bromine separator and the bromine drawn off and sent to recovery, as through line 41.

Effluent from the oxidation of hydrogen chloride can also be supplied to the zone 30 via valved lines 17, 18, 19 where it is desired that the chlorine be supplied from the oxidation of hydrogen chloride reaction.

The following non-limiting examples will further demonstrate a specific and preferred embodiment of the instant invention.

Example I

An aqueous brine solution containing 0.25 percent (2500 p.p.m.) of bromine, though in the form of a sodium bromide salt is heated to 90° C. and contacted with an effluent from an oxidation of hydrogen chloride reaction; which effluent is formed by contacting together within a zone hydrogen chloride and air in a molar ratio of hydrogen chloride:air of about 1.0:1.3 at a temperature of 350° C. in the presence of a copper chloride catalyst, approximately 35 percent of the hydrogen chloride being oxidized to form elemental chlorine. The resulting mixture of gases and liquids resulting from the contacting together of the hydrogen chloride oxidation effluent and the brine are fed into the upper portion of a steaming-out tower, and the descending liquid contacted countercurrently with steam. From the top of the steaming-out tower is evolved water and bromine in gaseous form. This effluent from the top of the steaming-out tower is condensed and passed to a separator wherein a bromine and aqueous layer are stratified. The bromine layer is withdrawn. High purity bromine is recovered in good yield.

Example II

The foregoing example is repeated in all details except that two staged steaming-out towers are used in the process which, among other things, produce a more efficient operation and provides bromine of slightly higher purity.

An upper and lower steaming-out tower are provided, these towers being one above the other and being connected together by two lines, one line providing for a flow of gases from the lower reactor to the upper reactor and the other line providing for the flow of liquids from the upper reactor to the lower reactor. The bromide solution at 90° C. is fed into the top portion of the upper steaming-out tower. The hydrogen chloride oxidation effluent and steam are simultaneously injected into the bottom portion of the lower steaming-out tower. An effluent of steam and bromine are removed from the top of the lower steaming-out tower and passed into the bottom of the upper steaming-out tower, while simultaneously, the liquid solution is removed from the bottom of the upper steaming-out tower and passed into the upper portion of the lower steaming-out tower.

The effluent from the top of the upper steaming-out tower is passed into a condenser wherein the gases are vented and the liquids are condensed and passed to a separator. The bromine from the separator is passed into the upper portion of a purification column wherein steam is injected. Elemental bromine is removed from the bottom of the purification column and recovered, while effluent from the purification column is passed back to the upper steaming-out tower.

High purity elemental bromine is recovered in very high yield.

Example III

Sea water containing from 55 to 60 parts of bromine, per million parts of water, though in the form of a sodium bromide salt is contacted in a suitable retort with an effluent from an oxidation of hydrogen chloride reactor. The effluent is formed by contacting together hydrogen chloride and air in a molar ratio of hydrogen chloride:air of about 1.0:1.25, at a temperature of 500° C. in the presence of a copper chloride catalyst. Approximately 40 percent of the hydrogen chloride is oxidized to form elemental chlorine. For each mole of chlorine formed three moles of hydrogen chloride is unconverted.

The sea water is contacted with the effluent so that all of the bromine is released as elemental bromine, all of the chlorine of the effluent being utilized. And the water is acidized by the unconverted hydrogen chloride and maintained at a pH ranging from about 3 to 6. The acidized water, with the effluent, is then fed into a packed column wherein the gases are supplemented by the addition of a volume of air. This additional air assures complete extraction of the bromine from the aqueous solution prior to the time when it is drawn from the bottom of the tower and ditched.

The bromine laden gas is then contacted with sulfur dioxide and water in an absorption tower. An 8 percent hydrogen bromide in sulfuric acid solution is formed. The waste air, stripped of its bromine is separated from the top of the absorption tower.

The hydrogen bromide solution is then fed into a steam stripping still wherein the solution is contacted with chlorine for oxidation of the hydrogen bromide. The hydrogen bromide is oxidized to liberate the elemental bromine, and the bromine is removed from the still by steam distillation.

The effluent from the steam still is condensed and sent to a separator wherein a bromine and water layer is stratified. The bromine is drawn off in the bottom of this separator and recovered.

Example IV

When the foregoing example is repeated except that a 75 percent conversion level of the hydrogen chloride is obtained and that about one-half of the effluent from the oxychlorination reaction is substituted for the chlorine used for oxidation of hydrogen bromide good results are similarly obtained. Only a minute amount of the bromine is lost from the bromine-water separator when bleeding the inert gases from the separator.

It is apparent that the process combination of the present invention is capable of considerable modification without departing from the spirit and scope of the invention.

The basic novelty of the instant invention resides primarily in the unique feature of providing the art with an oxidation of hydrogen chloride technique which enhances the value of the technique itself and also provides a novel process for the overall production of elemental bromine from cheap raw materials, among other advantages.

As to the hydrogen chloride oxidation step of the overall process, all that is essential is that a hydrogen chloride steam be oxidized with an oxygen-containing gas to form sufficient chlorine for oxidation of the bromide salt contained within the solution from which the elemental bromine is to be extracted. Preferably, the hydrogen chloride in contacted with air in the presence of a suitable oxidation catalyst to provide a conversion of from about 30 percent to about 75 percent of the hydrogen chloride to elemental chlorine. Such conversion levels are also sufficient to provide proper and sufficient acidification of the brine to be treated. This acidification of the sea water should produce a pH ranging from about 3 to 6.

The relative proportions of the reactants used in the hydrogen chloride oxidation steps of the process combination will vary considerably dependent upon the precise temperature conditions and nature and state of the catalyst employed, these being selectable dependent upon the desired final result. In fact, the preferred hydrogen chloride oxidation condition is one providing just sufficient conversion of the hydrogen chloride to chlorine to provide the desired amount of chlorine to the process and also just sufficient unconverted hydrogen chloride to provide a sufficient pH to the brine being treated.

Air and hydrogen chloride are generally contacted together under oxidizing conditions in proportions generally ranging from about 50 to 70 volume percent of air and from about 30 to 50 volume percent of moist or anhydrous hydrogen chloride.

Suitable catalysts for effecting the desired hydrogen chloride oxidation are described throughout the oxychlorination art, for example, in U.S. 2,191,980; U.S. 2,204,-

733; U.S. 2,206,399; U.S. 2,442,285 and U.S. 2,448,255, and these references are incorporated by way of reference. The most preferred of these salts of metals of variable valence catalysts, however, is a copper chloride mixture mounted upon an inert carrier such as silica, silica gel, alumina, pumice, asbestos, kieselguhr, diatomaceous earth and the like. The catalyst can be used in a fixed or fluidized bed.

The temperature at which the hydrogen chloride oxidation step is normally conducted can range from about 300° C. to about 700° C. Preferably, temperature ranges from about 350° C. to about 500° C.

The pressure of the hydrogen chloride oxidation can range from atmospheric to several hundred pounds per square inch though generally the reaction is conducted at from about atmospheric to about 100 pounds per square inch.

The sulfur dioxide and water added to form the hydrogen bromide solution from the bromine from the blowing-out step for best results generally ranges from about 10 to 20 parts of sulfur dioxide per 100 parts of water.

Suitable process data and apparatus for carrying out the practice of this invention are also given in U.S. 2,143,223 and U.S. 2,143,224 and these patents are included for purposes of reference.

As is apparent, any brine containing solution, the salt of which is oxidizable with chlorine can be treated pursuant to the practice of this invention. Thus, a brine most frequently used because of its wide availability is sea water which contains normally about 50 to 60 parts of bromine, per million parts of water (p.p.m.). However, there are many other natural brines and also artificially made brines which can be so treated. For example, natural brines known as Michigan Field brines, Arkansas Field brines, Dead Sea and Israel brine, Searles Lake brine from California, Niagara Formation brine from Ohio and various other naturally occurring brines can be treated. Moreover, many by-product liquids from the salt industry are available and can be treated pursuant to this invention. In fact, certain mineral water and salt springs contain much higher concentrations of oxidizable bromide salts than some of the naturally occurring brines, and these are highly desirable because of their bromine content. Whether natural or artificial, however, the most preferred brines for the practice of this invention are those containing high concentrations of bromine. For example, deep well brines and also liquids which are by-products of the salt industry often contain as much as 2500 p.p.m. of bromine. For example, in the manufacture of potassium chloride from carnallite there is produced a mother-liquor containing 2500 p.p.m. of bromine as magnesium bromide. Dead Sea and Israel brine also contain high concentrations of bromine. But whatever the source of the brine solution, if the solution itself contains sufficient bromine, though in the form of an oxidizable bromide salt, then the series of bromine concentrating steps can be eliminated. Thus, it has been found that these concentrations with the sulfur dioxide steps, for example, can be eleminated if the bromine contained within the solution is as high as about one-thousand parts, per million parts of solution. Preferably, however, the solution should contain at least about 2500 parts of bromine, per million parts of solution. A solution containing from about 2500 p.p.m. to as much as 1–2 percent bromine is found especially suitable.

Any solution containing a bromide salt oxidizable with chlorine can be used pursuant to the practice of this invention. These solutions are described throughout the patent art and include aqueous solutions of halogen acids, such as hydrogen bromide, alkali and alkaline-earth metal salts such a sodium bromide, potassium bromide, magnesium bromide and the like, and transition metal bromide salts such as zinc bromide, cupric bromide, ferrous bromide, manganese bromide, nickel bromide, and the like.

Moreover, while the instant process has been described with particular reference to a brine treating process wherein sulfur dioxide is employed to convert the bromide and desorb the bromine into a bromine laden air stream, and finally to a hydrogen bromide soluiton, it will be understood that the method is applicable to treating any hydrogen bromide solution however obtained. Further, other methods can be employed for concentrating the bromine other than by the use of sulfur dioxide. For example, nitric oxide can be used to react with the bromide salt so as to form hydrogen bromide.

Having described the invention, what is claimed is:

1. A process for the extraction of elemental bromine from an aqueous brine solution, the steps comprising (a) contacting together in a first zone hydrogen chloride and an oxygen-containing gas in the presence of a variable state oxidation catalyst so that a portion of the hydrogen chloride is oxidized to elemental chlorine to form an effluent consisting essentially of chlorine, unreacted hydrogen chloride and other inert gases, (b) mixing together the effluent and the brine solution, which contains from about 55 to about 2500 parts of bromine, per million parts of solution, to liberate elemental bromine, and then (c) stripping out and recovering elemental bromine; said unreacted hydrogen chloride serving to effect at least partial acidification of the brine solution and said inert gases serving to effect at least partial stripping out of the elemental bromine from the brine solution.

2. The process of claim 1 wherein the hydrogen chloride and the oxygen-containing gas are contacted in the first zone so as to provide a conversion of from about 30 percent to about 75 percent of the hydrogen chloride to elemental chlorine.

3. The process of claim 1 wherein the total acidification of said brine solution produces a pH ranging from about 3 to 6.

References Cited by the Examiner

UNITED STATES PATENTS

| | | | |
|---|---|---|---|
| 1,917,762 | 7/33 | Grebe et al. | 23—216 |
| 2,536,457 | 1/51 | Mugdan | 23—216 |
| 2,542,961 | 2/51 | Johnson et al. | 23—219 |
| 2,825,627 | 3/58 | Redniss et al. | 23—154 |

MAURICE A. BRINDISI, *Primary Examiner.*